United States Patent [19]

Kishida et al.

[11] Patent Number: 4,617,891
[45] Date of Patent: Oct. 21, 1986

[54] SECONDARY AIR SUPPLY FOR INTERNAL COMBUSTION ENGINE

[75] Inventors: Eiji Kishida, Tokyo; Shumpei Hasegawa, Saitama, both of Japan

[73] Assignee: Honda Giken Kogyo Kabushiki Kaisha, Tokyo, Japan

[21] Appl. No.: 647,113

[22] Filed: Sep. 4, 1984

[30] Foreign Application Priority Data

Sep. 3, 1983 [JP] Japan ................................. 58-162443

[51] Int. Cl.⁴ ............................................ F02M 23/04
[52] U.S. Cl. ..................................... 123/344; 123/589
[58] Field of Search ................................ 123/585–589, 123/344

[56] References Cited

U.S. PATENT DOCUMENTS 4,483,308 11/1984 Hasegawa ............................ 123/589
4,495,922 1/1985 Fujimura et al. .................... 123/589

Primary Examiner—William A. Cuchlinski, Jr.
Attorney, Agent, or Firm—Lyon & Lyon

[57] ABSTRACT

A secondary air intake system is used in an internal combustion engine. The system supplies secondary air through a first and a second secondary air passage. The first secondary air passage includes a first vacuum operated air control valve. A vacuum control which includes an electrically operated vacuum control valve operates the first vacuum operated air control valve to vary the effective area of the first secondary air passage. The second secondary air passage includes a second vacuum operated air control valve and an electrically operated air control valve positioned in series. Intake manifold vacuum operates the second vacuum operated air control valve to vary the effective area of the second secondary air passage. An air-fuel ratio control which includes an intake air temperature sensor, an exhaust gas oxygen concentration sensor and a throttle plate vacuum sensor determines the engine air-fuel ratio to intermittently open and close the electrically operated air control valve to open and close the second secondary air control passage. The air-fuel ratio control also operates the electrically operated vacuum control valve to gradually open and close the first vacuum operated air control valve to gradually open and close the first secondary air passage.

7 Claims, 5 Drawing Figures

SECONDARY AIR SUPPLY FOR INTERNAL COMBUSTION ENGINE

In internal combustion engines having a three-way catalytic converter in the exhaust system to purify the exhaust gas, the three-way catalytic converter is the most effective when the air-fuel ratio of the intake mixture is at its stoichiometric ratio of 14.7:1. The current practice is to provide feedback control of the air-fuel ratio to the vicinity of the stoichiometric ratio in accordance with the concentration of the exhaust gas and the running state of the engine.

Typically the air-fuel ratio is controlled by providing a secondary air intake passage communicating with the downstream of the throttle valve of a carburetor. The air-fuel ratio is controlled by providing the secondary air passage with an electromagnetic valve so that the electromagnetic valve may be opened or closed in response to the output signal of an oxygen concentration sensor which is positioned in the exhaust system. Whether the actual air-fuel ratio is lean or rich is determined from the output signal of the oxygen concentration sensor. The secondary air passage is opened to supply the secondary air to the downstream of the throttle valve when it is determined that the air-fuel ratio is at a rich value. The secondary air passage is closed to interrupt the supply of the secondary air when it is determined that the air-fuel ratio is at a lean value.

The air-fuel ratio is subject to a proportional (P) control by opening and closing the secondary air passage with the electromagnetic valve. The control rate for the air-fuel ratio is determined from the effective area of the secondary air passage. The difference in the flow rate of the secondary air between when the electromagnetic valve is open and closed is large because of the large effective area of the secondary air passage. This makes it possible to control the air control valve over a wide range. But when the effective area of the secondary air passage is large the fluctuating range of the air-fuel ratio with respect to the desired stoichiometric value is also large being increased by the difference in the flow rate of the secondary air between when the electromagnetic valve is open and closed. This results in a surging running of the engine exemplified by fluctuations in the engine r.p.m.

It is, therefore, an object of the present invention to provide a secondary air supply system to control the air-fuel ratio over the wide engine speed range while improving the running of the engine.

A secondary air supply system according to the present invention includes means for determining an air-fuel ratio of the engine; first and second secondary air passages communicating with the downstream of the throttle valve of a carburetor; a first vacuum operated air control valve positioned in the first secondary air passage for changing the effective area of the first secondary air passage in accordance with the vacuum in a first vacuum receiving chamber; an electromagnetic air control valve positioned in the second secondary air passage for opening and closing the second secondary air passage in accordance with the determined air-fuel ratio; a second vacuum operated air control valve positioned in the second secondary air passage for changing the effective area of the second secondary air passage in accordance with the vacuum in a second vacuum receiving chamber communicating with the downstream of the throttle valve; vacuum control means for applying a control vacuum to the first vacuum receiving chamber so that the effective area of the first secondary air passage may be gradually increased or decreased to maintain a desired air-fuel ratio.

The present invention will be described in connection with a preferred embodiment shown in the accompanying drawings wherein.

Figure 1:
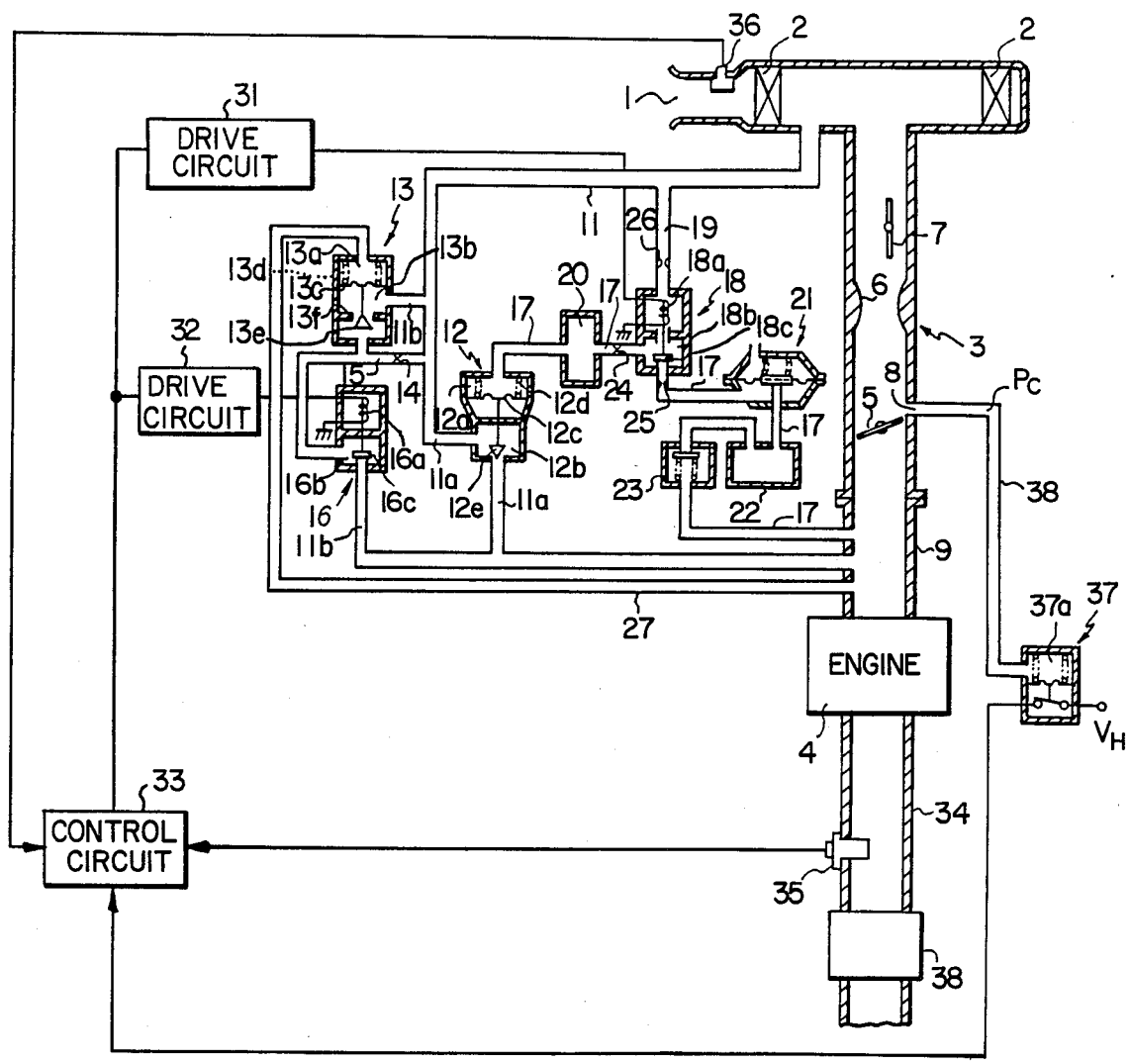
FIG. 1 is a schematic diagram showing the preferred embodiment of the present invention.
Figure 3:
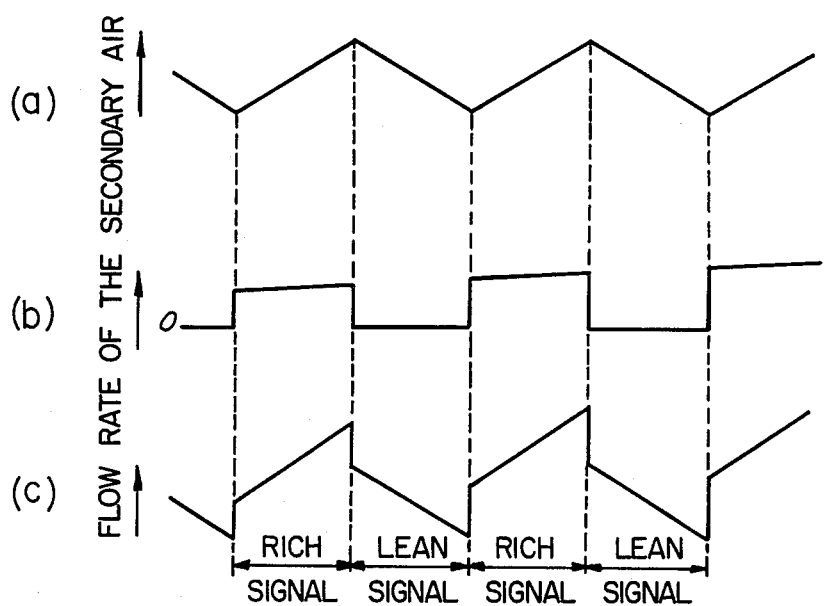

FIG. 3a, b and c are a waveform charts illustrating the secondary air flow of the embodiment of FIG. 1 under different control conditions.

In the secondary air supply system according to one embodiment of the present invention shown in FIG. 1, primary intake air is supplied from an atmosphere suction port 1 through an air cleaner 2 and a carburetor 3 to an engine 4. The carburetor 3 is provided with a throttle valve 5, a venturi 6 upstream of the throttle valve 5, and a choke valve 7 upstream of the venturi 6. A vacuum detection port 8 is positioned upstream of the throttle valve 5 when the throttle valve 5 is closed and downstream of the throttle valve 5 when the throttle valve is open.

A secondary air passage 11 communicates between a point in the intake manifold 9 downstream of the throttle valve 5, and a point in the air discharge port of the air filter 2. The secondary air passage 11 is divided into two air control passages 11a and 11b to provide control of the secondary air. The air control passage 11a is provided with a vacuum responsive first control valve 12. This air control valve 12 includes a vacuum chamber 12a, a valve chamber 12b forming a part of the air control passage 11a, a diaphragm 12c forming a part of the vacuum chamber 12a, a valve spring 12d positioned in the vacuum chamber 12a, and a tapered valve member 12e positioned in the valve chamber 12b and biased through the diaphragm 12c by the valve spring 12d to close the air control passage 11a. The air control valve 12 changes the effective area of the air control passage 11a in accordance with the level of the vacuum prevailing in the vacuum chamber 12a. The effective area of the control passage 11a is increased with the increase in the vacuum and decreased with a decrease in the vacuum in the vacuum chamber 12a.

The first air control valve 12 has its vacuum chamber 12a communicating with the intake manifold 9 by vacuum supply passage 17. This vacuum supply passage 17 includes an electromagnetic valve 18. The electromagnetic valve 18 includes a solenoid 18a, a valve chamber 18b forming a part of the vacuum supply passage 17; and a valve member 18c positioned in the valve chamber 18b operated by the solenoid 18a. *The valve chamber 18b is vented to the atmosphere by an atmosphere supply passage 19.* When the solenoid 18a is deenergized it connects the vacuum supply passage 17 from the vacuum chamber 12a to the atmosphere supply passage 19 through the valve chamber 18b. When the solenoid 18a is energized it connects the vacuum supply passage 17 from the vacuum chamber 12a to the constant vacuum control valve 21. The vacuum supply passage 17 is provided with a surge tank 20, a constant vacuum control valve 21, a storage tank 22 and a check valve 23 as shown in FIG. 1. The constant vacuum control valve 21 stabilizes the vacuum downstream of the throttle valve 5 to a predetermined level Pr when the vacuum exceeds this predetermined level. The check valve 23 allows only communication from downstream of the throttle valve 5 to the constant vacuum control valve 21. The vacuum supply passages 17 at both sides of the electromagnetic valve 18 are provided with orifices 24 and 25. The atmosphere supply passage 19 also is provided with an orifice 26.

The air control passage 11b is provided with a vacuum responsive second air control valve 13. This second air control valve 13 includes a vacuum chamber 13a forming a second vacuum receiving chamber, a valve chamber 13b forming a part of the air control passage 11b, a diaphragm 13c forming a part of the vacuum chamber 13a, a valve spring 13d positioned in the vacuum chamber 13a, a tapered valve member 13e positioned in the valve chamber 13b and biased through the diaphragm 13c by the valve spring 13d to open the air control passage 11b, and a valve seat 13f positioned in the valve chamber 13b and associated with the valve member 13e for determining the effective area of the air control passage 11b. The vacuum chamber 13a communicates with the intake manifold 9 by way of a vacuum supply passage 27. The effective area of the air control passage 11b is reduced with an increase in the vacuum supplied to the vacuum chamber 13a. An air correcting passage 15 having an orifice 14 for idle correction bypasses the second air control valve 13. In addition, the air control passage 11b is provided with an electromagnetic valve 16 downstream of the second air control valve 13. The electromagnetic valve 16 includes a solenoid 16a, a valve chamber 16b forming part of the air control passage 11b and a valve member 16c positioned in the valve chamber 16b and operated by the solenoid 16a. The electromagnetic valve 16 closes the air control passage 11b when the solenoid 16a is deenergized.

A control circuit 33 is connected to the solenoids 16a and 18a with drive circuits 31 and 32. The control circuit 33 is connected to an oxygen concentration sensor 35 positioned in the exhaust manifold 34. The oxygen concentration sensor 35 generates an output voltage $V_{O2}$ at a level corresponding to the oxygen concentration in the exhaust gas. The output voltage $V_{O2}$ increases in accordance with the increase in the oxygen concentration.

An air temperature sensor 36 and a vacuum switch 37 are also connected with the control circuit 33. The air temperature sensor 36 is positioned adjacent the air cleaner 2. When the intake air temperature exceeds a predetermined temperature $t_1$ the air temperature sensor 36 generates a high level signal at a voltage $V_H$. The vacuum switch 37 also detects the load upon the engine. The vacuum switch 37 is turned on when the level of the vacuum in a pressure receiving chamber 37a is lower than a predetermined level to generate a high-level signal at the voltage $V_H$. The pressure receiving chamber 37a communicates with the vacuum detection port 8 of a vacuum supply passage 38 which supplies a vacuum $P_C$.

Figure 2:
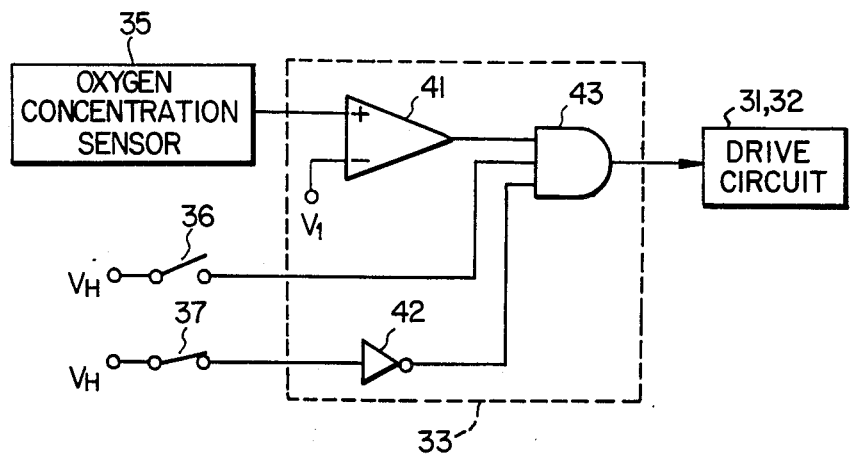
FIG. 2 is a flow chart illustrating the operation of the control circuit used in the embodiment of FIG. 1.

The control circuit 33 shown in FIG. 2 includes a comparator 41 for comparing the output voltage $V_{O2}$ of the oxygen concentration sensor 35 with a predetermined voltage $V_1$ corresponding to the stoichiometric air-fuel ratio, an inverter 42 connected with the output terminal of the vacuum switch 37, and an AND circuit 43 for taking the logic product of the comparator 41, the inverter 42 and the intake air temperature sensor 36. The output signal from the AND circuit 43 is fed to the drive circuits 31 and 32.

The intake secondary air supply system having the construction previously described operates as follows: First in the operation of the control circuit 33, when the output voltage $V_{O2}$ of the oxygen concentration sensor 35 is higher than the predetermined voltage $V_1$ ($V_{O2}$ greater than or equal to $V_1$), the air-fuel ratio is in the rich range and the output level of the comparator 41 is a high level. When the output voltage $V_{O2}$ is lower than the predetermined voltage $V_1$ ($V_{O2}$ less than $V_1$), the air-fuel ratio is in the lean range and the output of the comparator 41 is a low level.

This assumes that the air temperature 36 and the vacuum switch 37 inputs of the AND circuits 43 (other than the input coming from the comparator 41) are at the high level. This occurs when (1) the intake temperature is higher than the predetermined temperature level $t_1$ so that the intake temperature sensor 36 takes the high level and (2) when the vacuum switch 37 is turned off because the level of the supply vacuum $P_c$ to the vacuum switch 37 is higher than the predetermined pressure so that the inverter 42 also takes the high level. Therefore the output level of the AND circuit becomes identical to the output level of the comparator 41.

When it is determined from the output level of the oxygen sensor 35 that the air-fuel ratio is in the rich range, the output level of the AND circuit 43 is high and it is supplied as a rich signal to the drive circuits 31 and 32. When it is determined that the air-fuel ratio is in the lean range, the output level of the AND circuit 43 is low and it is supplied as a lean signal to the drive circuits 31 and 32.

The drive circuits 31 and 32 deenergize the solenoids 16a and 18a to render the electromagnetic valves 16 and 18 inoperative in response to the lean signal and energize the solenoids 16a and 18a to render the electromagnetic valves 16 and 18 operative in response to the rich signal.

When the electromagnetic valves 16 and 18 are inoperative the electromagnetic valve 16 closes the air control passage 11b and the electromagnetic valve 18 closes the vacuum supply passage 17. The electromagnetic valve 18 on closing establishes communication between the vacuum chamber 12a and the atmosphere supply passage 19 to gradually reduce the vacuum in the vacuum chamber 12a. As the vacuum in the vacuum chamber 12a is reduced the first air control valve 12 also closes the air control passage 11a. Since no secondary air is supplied from the secondary air passage 11 to the engine 4 when the two air control passages 11a and 11b are closed the air-fuel ratio is controlled to the rich range.

Next, when the electromagnetic valves 16 and 18 are changed from their inoperative states to their operative states, the electromagnetic valve 16 is instantly opened to start the flow of the secondary air through the air control passage 11b at a rate corresponding to the opening of the second air control valve 13. Since the vacuum in the intake manifold 9, which varies with the increased load on the engine, is applied to the vacuum chamber 13a of the second air control valve 13, the opening of the second air control valve 13 varies with the engine load. The air control valve 13 is opened further on increased engine load because the level of the vacuum in the intake manifold 9 has dropped.

The electromagnetic valve 18 operates to communicate with the vacuum supply passage 17 but closes the communication with the atmosphere supply passage 19 to provide a vacuum $P_r$ to the vacuum chamber 12a.

This results in the pressure in the vacuum chamber 12a gradually approaching the vacuum $P_r$. This opens the first air control valve 12 to gradually increase the flow rate of the secondary air through the air control passage 11a. Therefore, the secondary air is supplied at the combined air flow rate flows through the air control passages 11a and 11b from the intake secondary air passage 11 to the engine 4.

During operation of the engine, if the pressure in the vacuum chamber 12a immediately before the supply of the vacuum $P_r$ is substantially equal to the atmospheric pressure the first air control valve 12 is opened by the supply of the vacuum $P_r$. This starts the secondary air to flow into the air control passage 11a until its flow rate is gradually increased as has been described.

Next, when the electromagnetic valves 16 and 18 are changed from their operative states to their inoperative states, the electromagnetic valve 16 is closed to instantly shut off the air control passage 11b. The electromagnetic valve 18 also closes the vacuum supply passage 17 as previously described and restores the communication between the vacuum supply passage 17 at the side of the vacuum chamber 12a and the atmosphere supply passage 19. This results in the pressure in the vacuum chamber 12a gradually approaching the atmosphere. Therefore, the opening of the first air control valve 12 is gradually reduced so that the effective area of the air control passage 11a is gradually decreased. This lowers the flow rate of the secondary air. Even with the air control passage 11b closed, the secondary air is supplied through the secondary air passage 11 to the engine 4 by way of the air control passage 11a. This flow rate is reduced with time.

When the air-fuel ratio is feedback-controlled to its stoichiometric value, the rich and lean signals are generated alternately but continuously. In the air control passage 11a, the secondary air flow rate is increased in the presence of the rich signal and is decreased in the presence of the lean signal (as shown in FIG. 3(a)) so that an integral (I) control operates. In the air control passage 11b, the secondary air intermittently flows (shown in FIG. 3(b)) and its flow rate varies with the engine load. This results in the flow rate of the secondary air through the intake secondary air passage 11 to the engine 4 being the summation of the secondary air flows through the air control passages 11a and 11b (shown in FIG. 3(c)). In addition, the changes in the secondary air flow rates vary because the respective time periods for the lean signal and the rich signal vary depending on the running state of the engine.

In a cruising state, the lean signal and the rich signal are generated alternately but promptly so that the flow rate of the secondary air through the air control passage 11a becomes substantially constant. This results in the air-fuel ratio being controlled to the vicinity of the stoichiometric value mainly by the flow rate of the secondary air which intermittently flows through the air control passage 11b.

In an accelerating state the air-fuel ratio is controlled to the stoichiometric value mainly by the increasing flow rate of the secondary air through the air control passage 11a.

Next, if the air intake temperature is below the predetermined temperature $t_1$ the output level of the intake air temperature sensor 36 becomes low so that the output level of the AND circuit 43 becomes low no matter how the output level of the oxygen concentration sensor 35 might change. For a light-load running engine at a slow or idle speed, the throttle valve 5 is substantially closed so that the level of the vacuum $P_c$ becomes lower than the predetermined level. This results in the vacuum switch 37 being turned on to drop the output of the inverter 42 to the low level so that the output of the AND circuit 43 takes the low level. Therefore, even if the air-fuel ratio is in the rich range, the lean signal is fed to the drive circuits 31 and 32 so that the control state of the air-fuel ratio is shifted from the feedback control to an open-loop control. In this open-loop control, both the electromagnetic valves 16 and 18 are inoperative to close the intake secondary air passage 11 so that the air-fuel ratio is controlled to the rich range from the stoichiometric value.

In the present invention two secondary air passages communicating with the downstream of the throttle valve provide control of the secondary intake air. The secondary air through one of the secondary air passages is gradually increased or decreased by the integral control in accordance with the determined air-fuel ratio. Also, in accordance with the determined air-fuel ratio the secondary air through the other intake secondary air passage is caused to intermittently flow by the action of the first electromagnetic control valve so that the flow rate in this passage varies with the level of the vacuum in the intake manifold. This permits increasing the integrally controlled flow rate of the secondary air through one of the secondary air passages and decreasing the intermittently controlled flow rate of the secondary air flowing through the other secondary air passage. This results in a reduction in the fluctuating range of the air-fuel ratio by the first electromagnetic air control valve while permitting control of the air-fuel ratio at a wide range. This reduces the engine surging phenomenon and improves control of the exhaust emission resulting in improved running of the engine. In addition, the simplified construction achieves a lower manufacturing cost.

In a internal combustion engine provided with the secondary air supply system of the present invention, which may be used on a motorcycle or other vehicle, the vacuum downstream of the throttle valve can be high and constant at the start of the vehicle. This permits applying the high constant vacuum to the vacuum chamber of the first air control valve as soon as the rich signal is generated. This results in an immediate control of the air-fuel ratio to the lean range. The shortened time before the air-fuel ratio takes the stoichiometric value reduces the content of the hydrocarbons and carbon monoxide in the exhaust gas at the start of the vehicle.

The invention claimed is:

1. A secondary air intake system for an internal combustion engine having a primary air intake with a throttle valve and an exhaust system comprising: means for determining an air-fuel ratio of the engine, first and second secondary air passages communicating with the downstream of the throttle valve of a carburetor; a first vacuum operated air control valve positioned in said first secondary air passage for changing the effective area of said first secondary air passage in accordance with the vacuum in a first vacuum receiving chamber; an electrically operated air control valve positioned in said second secondary air passage for opening and closing said second secondary air passage in accordance with said determined air-fuel ratio; a second vacuum operated air control valve positioned in said second secondary air passage for changing the effective area of said second secondary air passage in accordance with the vacuum in a second vacuum receiving chamber communicating with the downstream of said throttle valve; and vacuum control means for applying a control vacuum to said first vacuum receiving chamber so that the effective area of said first secondary air passage may be gradually increased or decreased in accordance with said determined air-fuel ratio.

2. The secondary air intake system defined in claim 1 wherein said vacuum control means comprises an electrically operated vacuum control valve which is operated by said air-fuel ratio determining means to gradually change the vacuum in said first vacuum receiving chamber to gradually open and close said first vacuum operated air control valve to gradually change the effective area of said first secondary air passage.

3. The secondary air intake system defined in claim 1 wherein said air-fuel ratio determining means includes inlet air temperature sensing means, exhaust gas oxygen concentration sensing means and throttle valve vacuum sensing means for determining said engine air-fuel ratio.

4. A secondary air intake system for an internal combustion engine comprising a secondary parallel flow air passage means, a first air control means and a second air control means, said first air control means includes air-fuel ratio control means for intermittent stopping and starting of said air flow in the second of said parallel flow air passage means and gradually stopping and starting of said air flow in the first of said parallel flow air passage means, and second air control means including vacuum control means for varying the volume of air flow in the first of said parallel flow air passage means and throttle plate vacuum means for varying the volume of air flow in the second of said parallel flow air passage means.

5. A secondary air intake system for an internal combustion engine having a primary air intake with a throttle valve, an intake manifold and an exhaust system comprising a first and second secondary air passage supplying secondary air to the intake manifold, a first vacuum operated air control valve positioned in said first secondary air passage, a second vacuum operated air control valve and an electrically operated air control valve positioned in series in said second secondary air passage, a vacuum control means for opening said first vacuum operated control valve to vary the air flow through said first secondary air passage, intake vacuum supplied to said second vacuum operated control valve to vary the air flow through said second secondary air passage, an air-fuel ratio control means for determining the air-fuel ratio during engine operation, said air-fuel ratio control means operating said electrically operated air control valve to intermittently open and close said second secondary air passage and operating said vacuum control means to open and close said first vacuum operated air valve to gradually open and close said first secondary air passage.

6. The secondary air intake system defined in claim 5 wherein said air-fuel ratio control means includes an air intake temperature sensing means, exhaust gas oxygen concentration sensing means and throttle valve vacuum sensing means for determining said engine air-fuel ratio.

7. The secondary air intake system defined in claim 5 wherein said vacuum control means includes an electrically operated vacuum control valve means for gradually opening and closing said first vacuum operated air control valve.

* * * * *